United States Patent
Holmes et al.

(10) Patent No.: US 6,753,989 B2
(45) Date of Patent: Jun. 22, 2004

(54) RECORDING SURFACE RELIEF MICROSTRUCTURE

(75) Inventors: Brian William Holmes, Surrey (GB); John David Wiltshire, Essex (GB)

(73) Assignee: De la Rue International Limited, Basingstoke (GB)

(*) Notice: Subject to any disclaimer, the term of this patent is extended or adjusted under 35 U.S.C. 154(b) by 0 days.

(21) Appl. No.: 10/201,154

(22) Filed: Jul. 24, 2002

(65) Prior Publication Data

US 2003/0152380 A9 Aug. 14, 2003

(30) Foreign Application Priority Data

Aug. 2, 2001 (GB) .............................................. 0118913

(51) Int. Cl.$^7$ ................................................ G03H 1/00
(52) U.S. Cl. ............................ 359/2; 359/10; 359/12; 359/31; 359/35; 283/86; 356/71; 430/1
(58) Field of Search ................................. 359/2, 10, 11, 359/12, 31, 32, 33, 35; 283/86; 355/2; 356/71; 430/1, 2

(56) References Cited

U.S. PATENT DOCUMENTS 3,630,593 A * 12/1971 Bartelt .......................... 359/3
3,677,634 A * 7/1972 Mathisen ........................ 355/2
5,615,022 A * 3/1997 Brandstetter .................. 359/12
6,043,913 A * 3/2000 Lu ............................... 359/25
6,606,432 B2 * 8/2003 Gaylord ....................... 385/37

FOREIGN PATENT DOCUMENTS

JP     05-011454     * 1/1993

* cited by examiner

Primary Examiner—Drew A. Dunn
Assistant Examiner—Leo Boutsikaris
(74) Attorney, Agent, or Firm—Oliff & Berridge, PLC (57) ABSTRACT

A method of recording a surface relief microstructure in a record medium includes:

i) causing a coherent reconstruction or replay beam to impinge on a holographic optical element assembly, the holographic optical element assembly including a holographic optical element (HOE), the assembly causing selected portions of the beam to interfere at a focal region after diffraction by the holographic optical element so as to reconstruct a real image of an aperture previously used to construct the HOE;

ii) locating a record medium at the focal region so that the real image is recorded; and, iii) causing relative movement between the record medium and the interfering beam portions and repeating steps i) and ii) so that the real image is recorded at a plurality of locations or pixels on the record medium.

14 Claims, 6 Drawing Sheets

RECORDING SURFACE RELIEF MICROSTRUCTURE

FIELD OF THE INVENTION

The invention relates to a method of recording a surface relief microstructure in a record medium.

DESCRIPTION OF THE PRIOR ART

Surface relief microstructures are used to create diffraction and holographic effects which find particular application in security features for use on documents of value such as identity cards, banknotes, and the like.

Conventionally, such a microstructure is created in two stages. In a first stage, a H1 device is created by causing interference between a reference laser beam and an object beam which has impinged on an object. The H1 is then used subsequently upon exposure by a suitable conjugate beam to generate a real image which is recorded on a H2 record medium.

This process is relatively cumbersome to achieve and recently digital diffraction, dot-matrix or digital holographic printers have become available for producing holographic master resists for the security industry. Dot-matrix holography is described in U.S. Pat. No. 6,043,913. In this process, individual dots are exposed by causing two laser beams to interfere with each other to generate interference fringes which are recorded. Typically, this is achieved by causing the two beams to impinge on respective portions of a focussing lens which then focuses the beams towards each other into a focussing region where the record medium is located.

The problem with this known technique is that in order to achieve spectral purity it is desirable to decrease the cross-sectional area of each beam but the consequence of this is that the size of the resultant spot expands.

SUMMARY OF THE INVENTION

In accordance with the present invention, a method of recording a surface relief microstructure in a record medium comprises:

i) causing a coherent reconstruction or replay beam to impinge on a holographic optical element assembly, the holographic optical element assembly including a holographic optical element (HOE), the assembly causing selected portions of the beam to interfere at a focal region after diffraction by the holographic optical element so as to reconstruct a real image of an aperture previously used to construct the HOE;

ii) locating a record medium at the focal region so that the real image is recorded; and, iii) causing relative movement between the record medium and the interfering beam portions and repeating steps i) and ii) so that the real image is recorded at a plurality of locations or pixels on the record medium.

With this invention, the cross-section of the beams which interfere to produce the diffraction pattern at the focal region is set independently from the resultant spot size by utilizing a HOE as the focussing element. It is a property of a HOE that the spot size is invariant with exposing beam size. This then enables the shape of the resultant spot to be selected as desired by suitably defining the shape of the aperture used to create the HOE.

In order to select the beam portions, the holographic optical assembly preferably further includes an aperture mask. This mask could be in the form of a diffractive optical element (DOE) but is preferably in the form of a spatial light modulator such as a liquid crystal display.

The beam portions may impinge on the record medium in a symmetrical manner but in a particularly preferred approach the holographic optical element is constructed and illuminated such that the beam portions impinge on the record medium at angles on the same side of a normal to the record medium. Usually, the beam portions are in substantially the same plane which also contains a normal passing through the point of impingement. Pixels which are imaged with just two beam portions will have the general quality that they resemble conventional dot matrix pixels. If, however, these beams are both on the same side of the normal in the same plane, or both tilted from the same side of that plane, then they will have the capability in either case to produce a "blazed grating". Pixels addressed by more than two beams would tend to involve individual beam portions which do not lie in the same plane, and would thus contain recorded fringe structures of great complexity akin to those of a conventional hologram in that particular pixel. A "blazed" grating is capable of very high diffraction efficiency levels up to 100% in the first order.

The invention also leads to the possibility of providing a set of interchangeable HOE's allowing the user to choose between a range of edge profiles and shapes for the image pixels of the final, recorded structure, typically a hologram. In some cases, only two beam portions will be used to reconstruct the real image but in other cases more than two beam portions could be used. Microstructures produced by simple two-beam interference can be referred to as diffraction gratings while pixels containing fringed structures produced by different multiple (i.e. more than two) beam portions from a range of directions are true "holograms".

One of the novel features of the method is that the actual dot forming each pixel is comprised of the interference between holographic real images in or near their common focal plane, rather than being formed at the point of intersection of two independently apertured laser beams described in other equipment which is commercially available. The introduction of a level of diffusion in the object beam would lead to the appearance of laser speckle within the resulting second generation recording, and although deleterious to the final image clarity and efficiency, would further illustrate the true holographic nature of the recording.

As mentioned above, the resultant microstructure can be used in a variety of applications but particularly for securing documents and other articles against fraudulent reproduction and counterfeiting. These include documents of value including banknotes, cheques, bonds, traveller cheques, stamps, certificates of authenticity, high value packaging goods and vouchers and the like.

BRIEF DESCRIPTION OF THE DRAWINGS

Some examples of methods according to the invention will now be described with reference to the accompanying drawings, in which:—

DESCRIPTION OF THE EMBODIMENTS

The preparation of a HOE for subsequent use in creating a dot-matrix hologram will be described with reference to FIG. 1.

Using the basic format for the recording of an H1 master hologram, a collimated reference beam 4 falls at a standard angle of reference upon a silver-halide recording plate 2. In place of artwork, lit by a diffuser screen from the rear, in a routine H1 production system, an objective lens 5 of some 60×magnification is used to illuminate fully the H1 (HOE) plate 2 with a beam 8. The beams 4,8 may originate from the same (or different) laser.

Using a spatial filter mounting system, a purpose-made pinhole 6 cut to a specific shape having a lateral dimension in the order of 12 microns is positioned in a micrometer-positioned x,y,z stage 7, fractionally in front of the focal point, such that the pinhole aperture is fully lit to achieve a "top-hat" distribution of light.

Development and bleaching of the recording plate 2 yields a HOE of high diffraction efficiency, with the property that reversal and illumination with the conjugate reference beam reconstructs the real image of the "pinhole" aperture 6 at the precise position of its recording.

Figure 1:
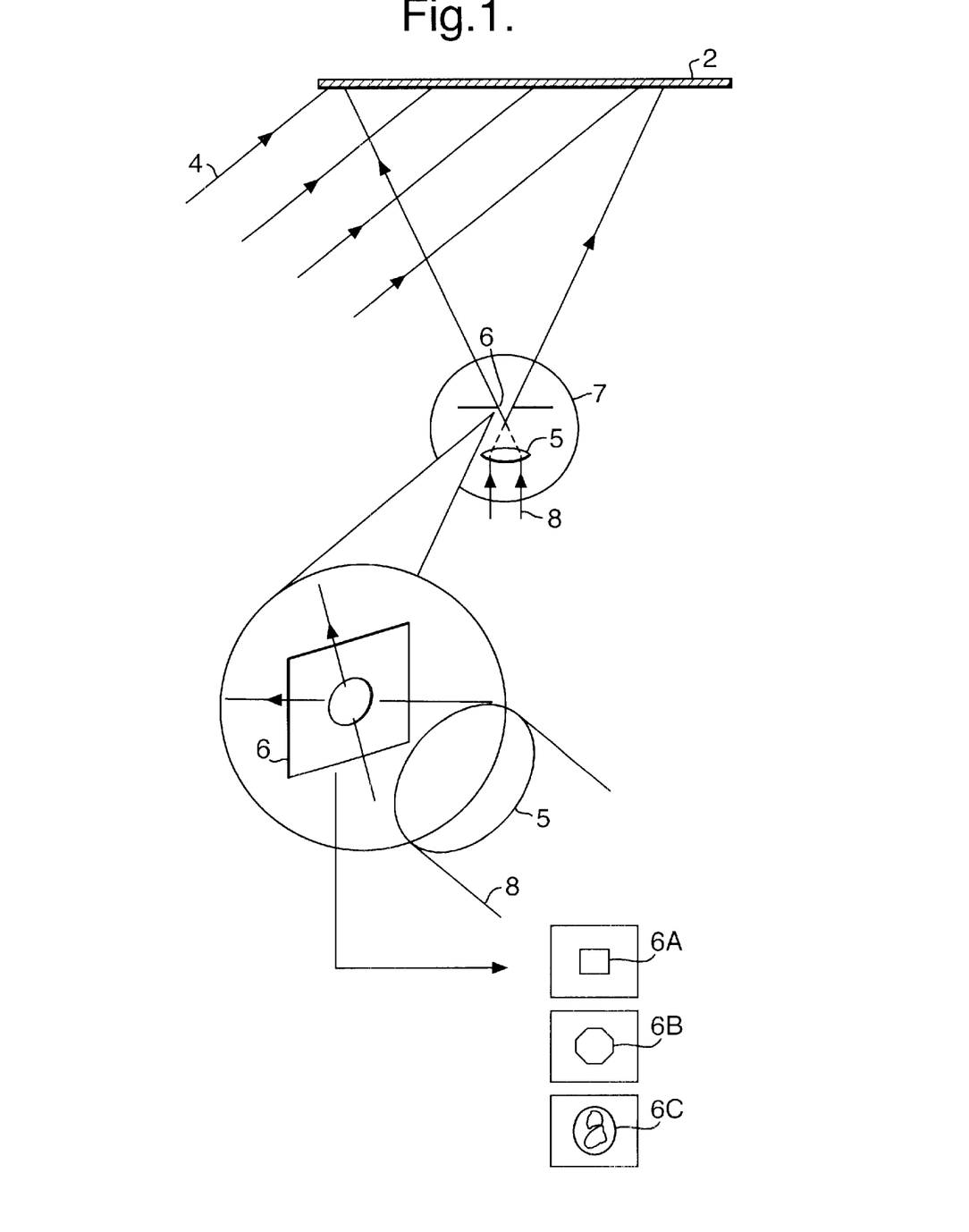
FIG. 1 illustrates the formation of a holographic optical element.

FIG. 1 illustrates 3 examples of pinholes 6, a square 6A, a hexagon 6B and a head logo 6C.

A range of pinhole apertures 6 with microscopic image detail could be prepared on a secure one-off basis by specialist photo-etching techniques. Each would be recorded into a separate H1 (HOE). There would also be the capability to record a "multi-redundant" type of HOE incorporating more than one type of source recording within the surface of a single plate, in order that final-product holograms could be made with a range of aperture shapes within a single image matrix.

Figure 2:
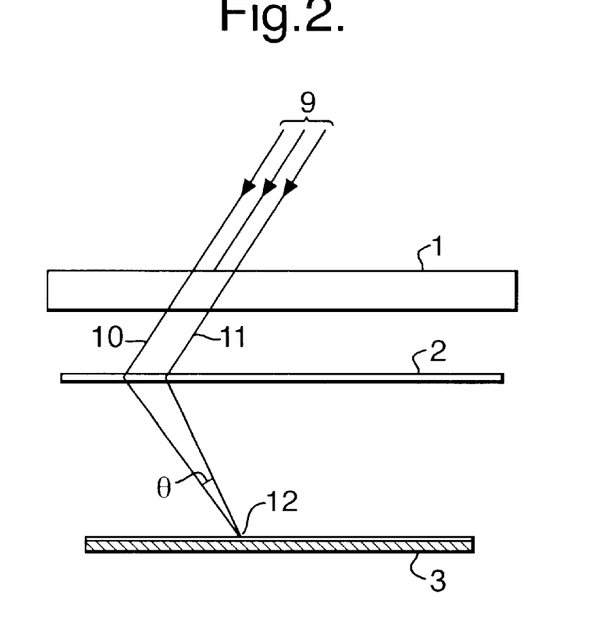
FIG. 2 illustrates the process for generating a surface relief microstructure.

Following creation of the HOE 2, this is then located adjacent a spatial light modulator (SLM) 1 as shown in FIG. 2. The SLM 1 is illuminated by a collimated, expanded laser beam 9, (a conjugate of 4), and is controlled to allow portions of the beam as shown at 10,11 to pass through and impinge on the HOE 2. This is most easily achieved by constructing the SLM 1 as a liquid crystal device which can be operated to open specific apertures as desired. The beam portions 10,11 are diffracted by the HOE 2 and brought to a focus at 12 where a record medium 3 is located and is exposed.

A number of methods will now be described whereby a coherent reconstruction or replay beam 9 can be manipulated in appropriate ways so as to cause coherent portions of the beam to impinge upon a HOE 2 in order to produce a focus 12 in the plane of a suitable record medium 3. The selected portions of the beam 10,11 are selected to fall within the exposed, diffractive area of the HOE 2. In particular, these portions of the beam can be selected to arrive from the same side of a normal to the plate to ensure the recording of a "blazed grating", capable of very high diffraction efficiency in one order, and thus having advantageous viewing qualities in many cases.

Method 1

The first method for generating a plurality of coherent reconstruction beams comprises a spatial light modulator (SLM) mask such as a liquid crystal display (as mentioned above). Transmissive apertures of any size or shape can be selectively and consecutively formed within the SLM to enable each individual exposure to be made in a separate position on the record medium 3. These apertures can be controlled selectively within the LCD as is well known, by the application of an appropriate electric field in the device. The "closed" pixels in the area of the SLM surrounding the apertures serve to fully attenuate rays of the reconstruction beam 9 outside of the required apertures, and the intensity of transmitted beams can be partially attenuated to achieve greyscale or tonal variation.

In this way, a plurality of transmitted beams of a full range of intensities, from a full range of angles, can be made to converge at the focal point of the HOE to enable the recording of image pixels of a wide range of optical properties. The resulting aggregated image, comprising such an elaborate range of individual pixels, may exhibit complex optical properties.

The image produced at the focus 12 will be that of the pinhole aperture 6 used to create the HOE 2. The beam portions may have different intensities achieved by Tonal (greyscale) variations in the individual apertures of the SLM controlled by software.

Method 2

A very simple method (not shown) for generating a plurality of beam portions from a reconstruction beam, comprises a mask located in the replay beam such that light is able to pass only through the mask via circular holes cut in the mask thus creating the number and angles of beam portions required. Such an array of circular pinholes could be controlled by a number of individual shutters, the whole mounted on a rotation stage in order to vary the grating orientation between individual pixels as required.

In attenuating the spread reconstruction beam in such a way, a small percentage only of the available laser energy finally arrives at the record medium, leading to extended exposure times and the need for conditions of high stability during the exposure of the master recording. We have devised alternative methods, therefore, to enable a high percentage of the available energy to reach the record plate.

Method 3

A second approach (not shown) to selecting which portions of the replay beam impinge upon the record medium involves the use of a kinoform as a beam array generator. (See "Reflective 16 phase Kinoform for Beam Array Generator." Long Pin Hsu Dahsiung; SPIE vol 1751, page 1841). Such a device consists of a cellular periodic grating and is capable of producing an array of equally spaced output beams, corresponding to diffraction orders, when illuminated with coherent light.

A design calculation fixes the intensity distribution and diffraction efficiency orders of the final recording, such that careful optimisation, together with the mounting of the device upon a rotation stage, in order to allow a full range of grating orientations, will allow the formation of pixels in the record medium containing a full range of grating structures by combination of the various output beams.

This method allows a higher percentage of the replay energy to impinge upon the record medium in each unit of exposure and thus enables shorter individual exposure times and improved stability at the expense of any control over the individual beam portion intensities.

Method 4

Figure 3:
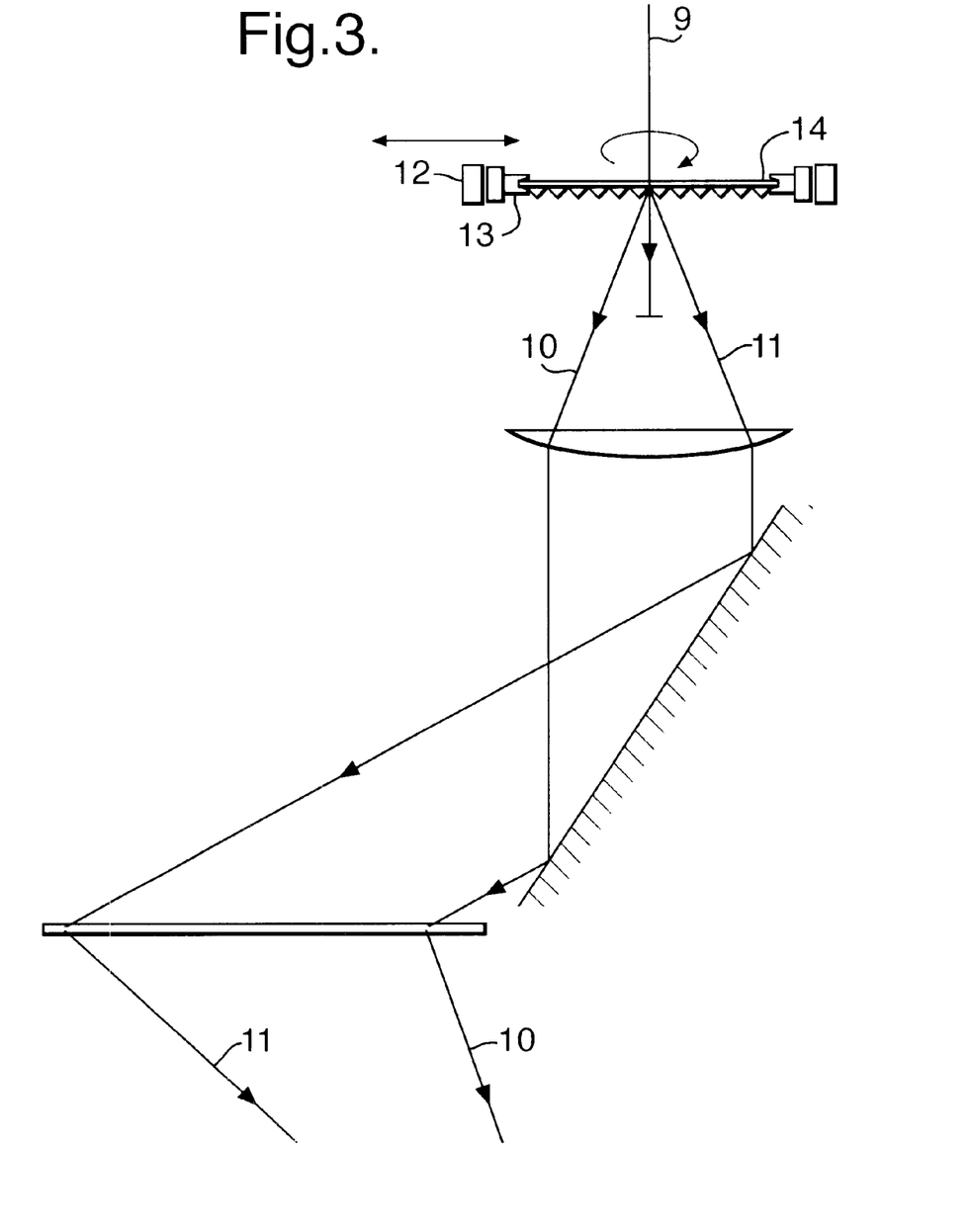
FIGS. 3–5 illustrate various alternative examples of an aperture mask.
Figure 4:
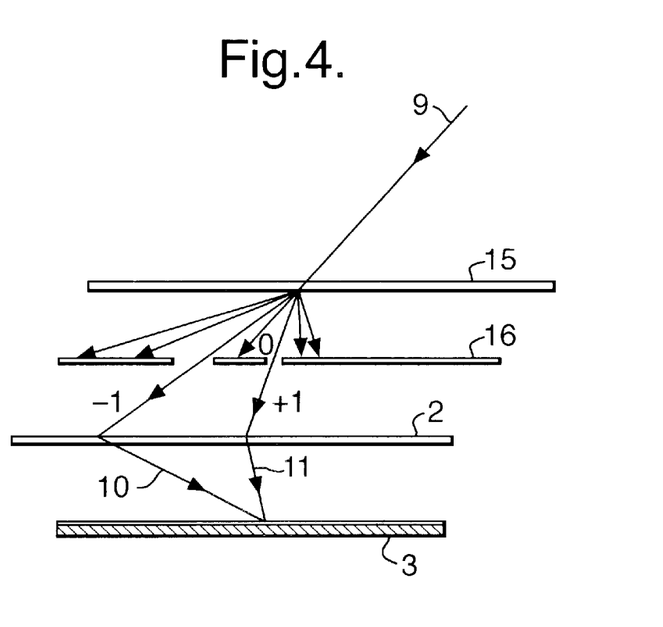

A further alternative method (FIG. 4) involves the use of a diffraction grating 15 whose first order diffracted beams are allowed to pass through the HOE 2, but whose zero and higher orders are blocked by a suitably positioned opaque screen 16. A blazed grating 15 is used to ensure that a high proportion of the incident energy is contained in the first order beams. FIG. 3 shows a grating of varying pitch 14 mounted in a sliding plateholder 12 such that linear lateral movement of the grating relative to the beam 9 causes a range of angles of diffraction to control the separation of the output beam. The fringe frequency of the gratings of individual image pixels in the record medium can thus be precisely controlled in order enable colour control of the pixel. The controlled rotation of the variable grating in a rotational stage 13 enables individual pixels to be created which thus have the advantages of blazed grating efficiency, colour control, and controlled rotational orientation of the grating structure.

Alternatively, a varied phase structure grating could be used. (See "Binary Surface-relief for Two-beam Splitter with continuous adjustable energy ratio". Zhou un, Tan Suquin, ii Xianming, Gao Wonqui, SPIE Vol 2866, page 124.) This method is capable of adjusting the energy of the two first order beams by illuminating varying portions of the grating comprising differing phase structures.

Method 5

Figure 5:
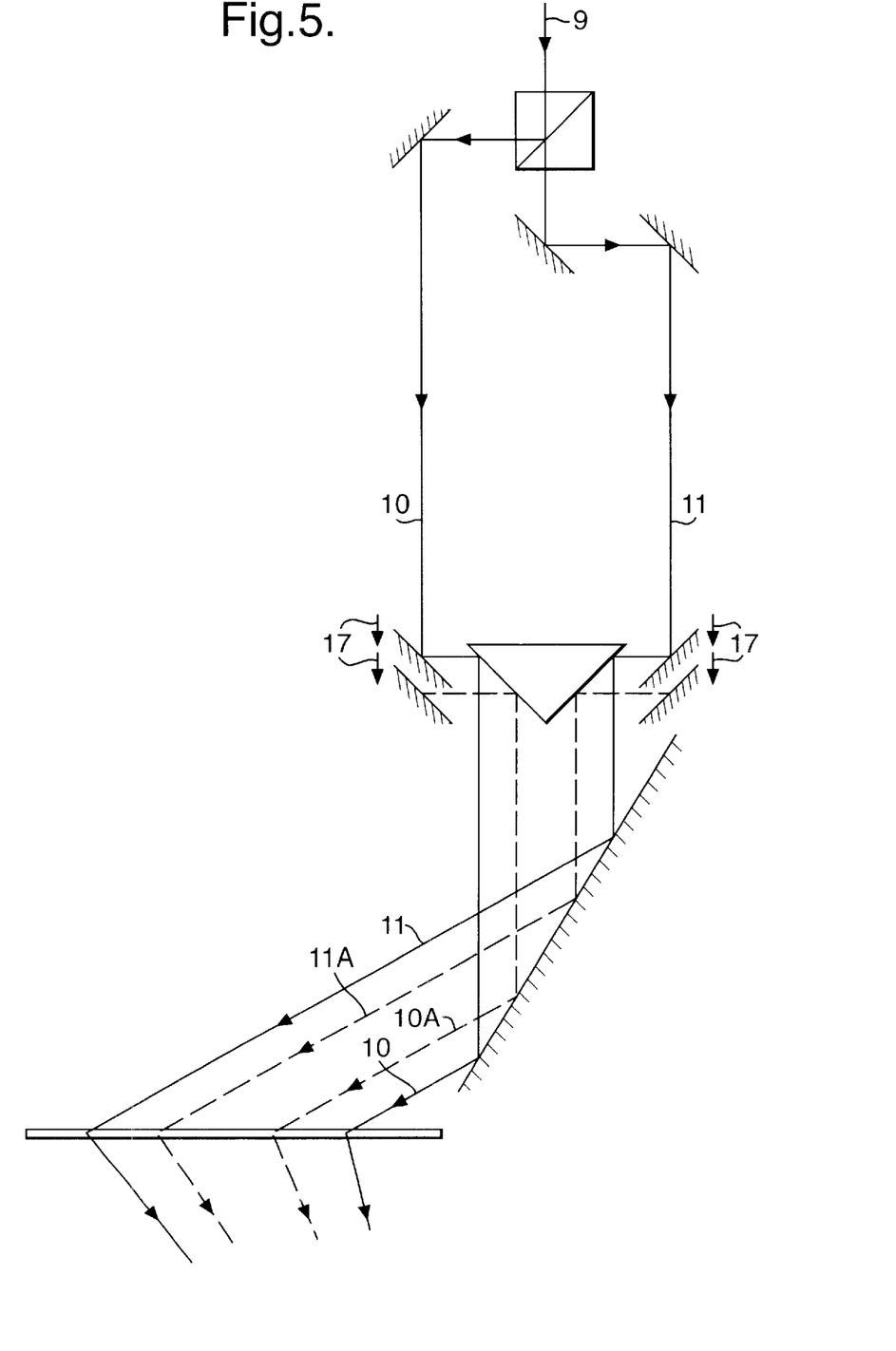

In this method a means of using a beamsplitter to divide a reconstruction beam 9 into two portions is shown in FIG. 5. The body of the whole assembly is rotated by computer control, whilst the rotation of the beam splitter relative to the plane polarised laser beam is avoided in order to avoid variation in the ratio of the energy divided into the beams 10 and 11 respectively. The translation of the corner mirrors 17 causes the beams 10,11 to follow different paths 10A,11A which enables the frequency of the gratings of individual pixels to be controlled in order to introduce colour effects to the final image as described in method 4. Again the blazed grating can be created by arranging for the focal point of the HOE to coincide with the axis of rotation of the system.

In each method following exposure, the record medium 3 is moved parallel with the HOE 2 to bring a new pixel into line with the focus 12 so that a further pixel can be exposed. Of course, a non-raster approach, such as a vector system, could be used.

Figure 8A:
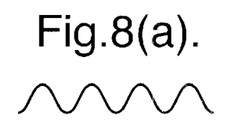
Figure 8B:
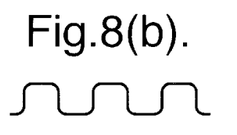
Figure 8C:
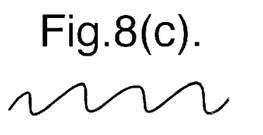

The use of a spatial light modulator 1 in conjunction with a holographic optical element 2 capable of incorporating special and wide ranging qualities of focus and encodation of the laser beams utilized in the production of the component dots of the image leads to a method of producing highly secure and easily recognizable images. In place of the common configuration where a lens is used to converge and focus laser light in such a way as to cause the two laser beams to produce a series of small gratings whose fringes have orientation corresponding to the rotation of the common plane of incidence of the two beams at the recording medium, the new method can utilize one of a series of interchangeable HOE's to converge and focus the imaging beams in non-axial and non-symmetrical ways, leading (as in the FIG. 2 example in which the beam portions 10,11 impinge on the record medium 3 from the same side of a normal to the record medium 3) to the preparation of off-axis interference fringes which result in "blazed" gratings capable of very high diffraction efficiency levels up to 100% in the first order. FIG. 8 shows the classical types of diffraction fringe structures—sinusoidal (FIG. 8A), square (FIG. 8B) and blazed (FIG. 8C) gratings. These have differing and well-understood properties, which importantly include the elimination of other orders of diffraction and high first order efficiency of the blazed type of grating.

Figure 6:
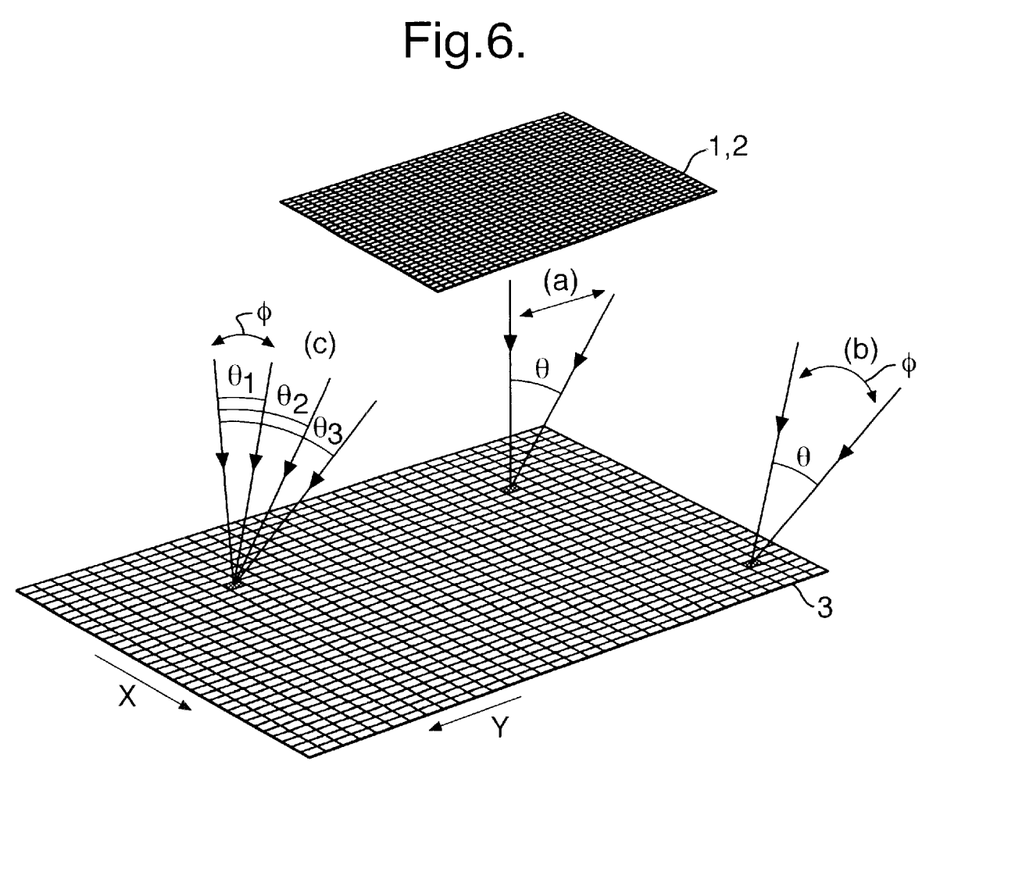
FIGS. 6 and 7 illustrate various alternative methods for generating a surface relief microstructure; and, FIG. 8 illustrates different fringe structures.

Additionally, the flexibility of the SLM 1 as a means of aperturing the incident light as shown in FIG. 6 means that various modes of operation of its selecting apertures can provide a wide range of pixel types in the final hologram.

(a) Pixels or dots formed by the interference of just two beams, one normal to the plane and one at angle θ to the first, with their plane of incidence vertical to the final hologram. By arranging for the opening of just two apertures of the SLM along a line upright and central with respect to the recording medium, pixels can be created which are capable of producing first order diffraction resulting in specific colours being perceived by a stationary viewer at defined viewing position. Control of the relative positions of the open apertures in the SLM along the specified line enables a matrix to be produced which forms a fully coloured image representing actual colours within the original artwork plane.

(b) Pixels or dots formed by the interference of just two beams (at angle θ to each other) with their plane of incidence rotated (by angle φ) relative to the hologram. For example, by arranging for the opening of apertures in the basic format of a clock-face, the rotational quality of the resulting fringe structures created in the relevant matrix of pixels has the ability to achieve image-switching effects which are ideal to create animation within an image, simulating the highly valued "lenticular" security effects used in classical "2D/3D" holography. Thus by moving the final hologram or the viewing position, image animation changes occur which eliminate counterfeiting attempts of secure documents by colour copier.

(c) Pixels or dots formed by the interference of more than two beams at different angles $\theta_1$, $\theta_2$, $\theta_3$ etc. and with different plane rotations φ. In its simplest form, "crosshatch" gratings can be produced in this way. A single open aperture in the SLM could be regarded as a "reference" beam, and opening apertures displaced respectively in the "x" and "y" direction on the SLM would result in such a structure. Thus light falling upon the finished hologram from the approximate direction of the "reference" beam will be diffracted in two perpendicular planes.

Figure 7:
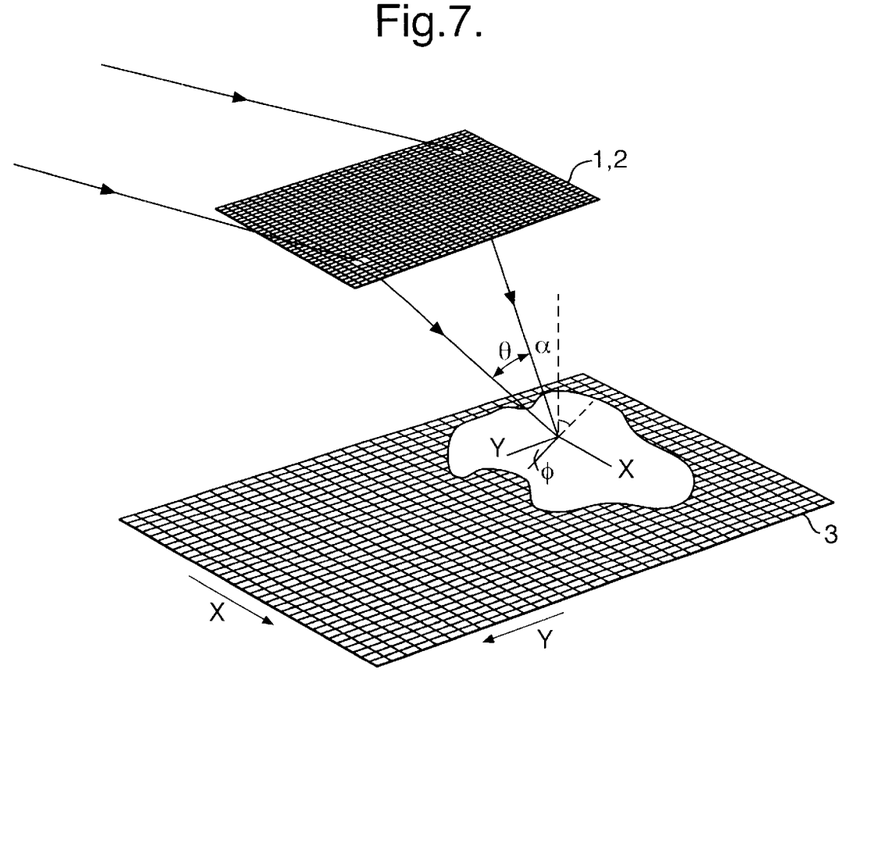

The angles which can be varied, as described above, are identified in FIG. 7, where:

α represents the angle between the normal and the most perpendicular of the incident beams, defining the fact a "blazed grating" is produced (α is zero in FIG. 3A).

θ is the angle between the incident beams, defining the frequency of the grating.

φ is the "azimuth" angle, defining the angle of the fringes of the microstructure relative to the grid or matrix in the surface of the recording material.

Extremely elaborate pixels can be produced along these lines which could individually be regarded as holograms in themselves, since a single "reference beam" can be made to interfere with a whole range of "object" beams of lower intensity transmitted with tonal variations by the SLM. The spatial appearance of the selecting apertures of the SLM opened for this purpose amount to the formation of a "diffuse wavefront" not dissimilar to the existence of an "H1" which gives rise to the familiar appearance of classical holography techniques. Ray tracing techniques can thus be used in conjunction with this method to produce images which have appearance closer to classical holograms. Adjacent selecting apertures may also have their viewing plane skewed in order to ensure that under typical viewing conditions, light from adjacent image pixels is diffracted in accordance with the requirements of binocular vision. These adjacent selecting apertures can contain pairs of stereographic views in order to reconstruct an apparently three-dimensional image.

Thus, an image produced by this system can be made to show features equivalent to routine dot-matrix holograms, in addition to specially designated areas which may contain full colour imaging, stereographic effects, and even genuine fully three-dimensional effects similar to the result of viewing a conventional hologram incorporating a real viewing window in the form of an "H1 master".

A further hybrid image form of interest results when a conventional H1 of comparable geometry is exchanged into the holographic optical element assembly in place of the focussing HOE 2 and recorded with a standard reference beam into the recording medium 3 so as to produce a genuine three-dimensional holographic image in the image space and in precise register with the pixellated image. For example, a conventional background plane could be placed in the space behind the pixellated foreground in such a way as to show all of the recognisable qualities of a conventional hologram background, its reconstruction wavefront distanced behind the plane of the main recording.

We claim:

1. A method of recording a surface relief microstructure in a record medium, the method comprising:
   i) causing a coherent reconstruction or replay beam to impinge on a holographic optical element assembly, the holographic optical element assembly including a holographic optical element (HOE), the assembly causing selected portions of the beam to interfere at a focal region after diffraction by the holographic optical element so as to reconstruct a real image of an aperture previously used to construct the HOE;
   ii) locating a record medium at the focal region so that the real image is recorded; and,
   iii) causing relative movement between the record medium and the interfering beam portions and repeating steps i) and ii) so that the real image is recorded at a plurality of locations or pixels on the record medium; wherein the holographic optical element assembly further includes an aperture mask for selecting the beam portions by defining suitable selecting apertures.

2. A method according to claim 1, wherein the holographic optical element is constructed so as to generate a real image of an aperture having a non-circular shape.

3. A method according to claim 2, wherein the aperture is in the shape of a polygon or an indicium.

4. A method according to claim 1, wherein the aperture is a pinhole.

5. A method according to claim 1, wherein the holographic optical element is constructed and illuminated such that the beam portions impinge on the record medium at angles on the same side of a normal to the record medium.

6. A method according to claim 1, wherein the aperture mask is a spatial light modulator such as a liquid crystal display.

7. A method according to claim 1, wherein the holographic optical element assembly further includes a diffraction grating and a screen arranged so that only first order diffracted beams from the diffraction grating pass through the HOE.

8. A method according to claim 1, wherein only two portions of the beam impinge on the record medium, the portions lying in a plane substantially orthogonal to the plane of the record medium.

9. A method according to claim 1, wherein only two portions of the beam impinge on the record medium, the portions lying in a plane which is rotated relative to the record medium for different locations such that resulting interference fringes are recorded in a range of directions of rotation relative to the record medium.

10. A method according to claim 1, wherein more than two portions of the beam impinge on the record medium.

11. A method according to claim 10, wherein, for a set of locations, a common reference beam portion is caused to interfere with respective different "object" beam portions.

12. A method according to claim 9, wherein only two portions of the beam impinge on the record medium, the portions lying in a plane which is rotated relative to the record medium for different locations such that resulting interference fringes are recorded in a range of directions of rotation relative to the record medium, wherein the "object" beam portions originate from positions on the HOE around a reference beam position.

13. A method according to claim 1, wherein the beam portions have different intensities.

14. A method according to claim 1, further comprising recording a 3D holographic image into the record medium in register with the real image pixels.

* * * * *